(No Model.)
G. W. ELLIOTT.
PICK.
No. 296,736. Patented Apr. 15, 1884.
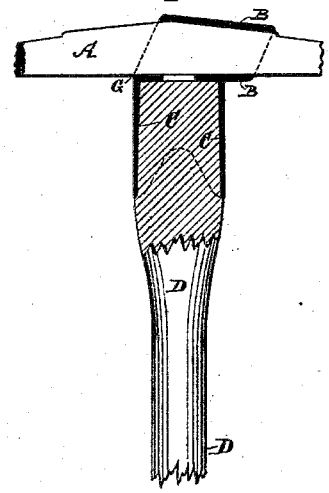
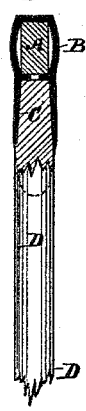
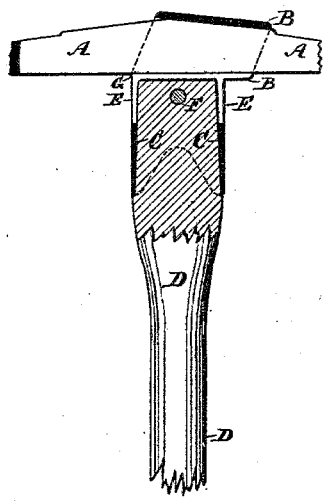
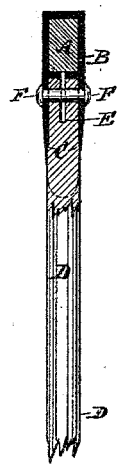
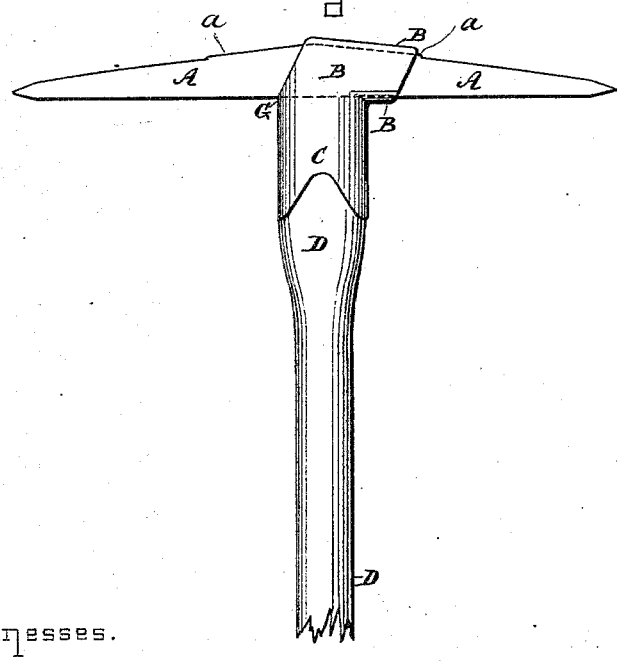
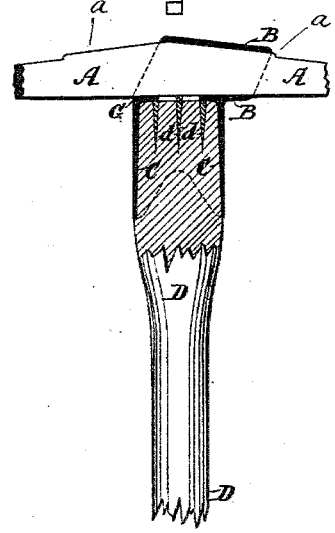
Witnesses.
Harry Shipley
Newton Wyckoff
Inventor.
G. W. Elliott
By his Attorney
Philip T. Dodge

UNITED STATES PATENT OFFICE.

GEORGE W. ELLIOTT, OF LIVERPOOL, COUNTY OF LANCASTER, ENGLAND.

PICK.

SPECIFICATION forming part of Letters Patent No. 296,736, dated April 15, 1884.

Application filed September 21, 1883. (No model.)

*To all whom it may concern:*

Be it known that I, GEORGE WILLIAM ELLIOTT, of Liverpool, in the county of Lancaster, in the Kingdom of England, have invented certain new and useful Improvements in Picks, of which the following is a specification.

This invention relates to the improvement in the construction of picks which are made with interchangeable blades, so that several can be used successively with one shaft.

The principal objections to picks as most commonly constructed are, the blade soon becomes loose in the head, and the screw or wedge is not able to keep it tight without some repairs being done to compensate for the wear; also, the screw or wedge is liable to wear out or be lost, and the pick is useless until it is replaced.

Now, my invention is designed to avoid these defects. It is best described by the accompanying drawings, in which Figure 1 represents my pick in its simplest form; Fig. 2, a longitudinal section of same at junction of head, blade, and shaft; Figs. 3, 4, 5, and 6, longitudinal and transverse sections of two variations of same.

In these drawings, A is the blade, made by preference of a rectangular or square section, and tapered from the center, which is the thickest point, to each end. A shoulder, *a*, may be formed on the blade, as shown in the drawings, which facilitates the stamping of it in manufacture and the subsequent fitting in the socket. After stamping or forging, the thicker part may be ground to fit the socket. The head is formed with a tapered hole or socket, B, of shape and size corresponding to those of the blade on either side of the center, the length of the socket and position of shaft socket or shoe being so arranged that when the pick is driven home into it the center line or axis of the shaft shall pass through the center of gravity of the blade and head. To enable this center of gravity to be in the center line of the shaft when the whole is in normal position, I prefer to slightly cut away the socket at the part nearest the center of the blade, and cause it to project for a considerable distance beyond the shaft socket or shoe C, or strap of the head, hereinafter described. The head has also formed in one piece with the blade-socket B a shaft socket or shoe, C, for firmly fixing the head upon the shaft D. This shoe or socket is preferably formed as a socket in the upper part next the blade, terminating in lugs, or as a shoe, into which the shaft is secured by being driven into wedges *d*, (shown in the drawings,) or it may be secured by any usual or known method. The two ends of the blade are of course made with the same taper and cross-sectional area at equal distances from the center at that part which fits in socket B. With a pick formed in this way each blow on the point of the blade projecting from the large end of the hole in the head tends to keep it tight in the head. Any enlargement of the hole in the head caused by use is compensated by the blade passing a little farther into the head before it becomes tight. By this arrangement the taper of the blade is the means of securing it firmly into the head without the use of any other part, and will always cause it to fit firmly and compensate for any reasonable wear.

Figs. 3 and 4 show a slight variation of my pick-head, in which the socket B is formed with slightly-curved sides. The object of this is to give a slight amount of elasticity to the blade-socket. The blade forced into this socket tends to straighten out the sides, and the sides thus somewhat straightened cause the top and bottom of the socket to press upon and hold tightly the blade through the constant molecular strain in the sides striving to recover their original shape.

Figs. 5 and 6 show another variation, wherein the shaft-socket is split with a slot or saw-slit, E, and the two sides bolted or riveted together with rivet F, thus drawing the two sides of the slit E together and holding the blade firmly in the socket.

In using the pick the blade is inserted in the socket. A single tap makes it sufficiently firm for use, and every succeeding blow tends to keep it firm in the head. I have found, however, that even when so firm that the other end can be used for a time without the blade becoming loose, a single blow with another similar blade at the point G is generally sufficient to loosen it sufficiently for the blade to fall out. In the drawings I have only shown the socket tapered as regards the top and bottom; but all four sides of the socket and blade can be made to taper, or any two opposite sides can, if desirable, be parallel, and the other two taper. In practice I prefer for the blade-socket and blade to taper at the top and bottom only, the two sides, as far as the socket reaches, being parallel.

I claim as my invention—

1. In combination with the handle, the tapered socket overhanging the handle on one side only, its larger end being next the handle, as described and shown.

2. In a pick, a blade-socket formed with stout curved sides, capable of giving slightly when the tapering blade is forced into the socket with great force, whereby a constant grip is maintained by the socket upon the blade, substantially as described.

In testimony whereof I have signed my name to this specification in the presence of two subscribing witnesses.

G. W. ELLIOTT.

Witnesses:
W. P. THOMPSON,
I. OWDEN O'BRIEN.